(12) United States Patent
Choate

(10) Patent No.: US 6,565,700 B2
(45) Date of Patent: May 20, 2003

(54) HEATED CUTTING WHEEL

(75) Inventor: Bruce Thomas Choate, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 101 days.

(21) Appl. No.: 09/842,302

(22) Filed: Apr. 25, 2001

(65) Prior Publication Data

US 2002/0157779 A1 Oct. 31, 2002

(51) Int. Cl.[7] .............................................. B65H 21/00
(52) U.S. Cl. ................. 156/304.6; 156/251; 156/304.1; 156/502; 156/515; 156/523; D83/171
(58) Field of Search ........................ 156/304.1, 304.6, 156/502, 523, 251, 515; 83/171

(56) References Cited

U.S. PATENT DOCUMENTS

| | | | | |
|---|---|---|---|---|
| 2,117,452 A | * | 5/1938 | Robinson et al. ............ | 156/515 |
| 2,551,811 A | * | 5/1951 | Mueller ........................ | 83/170 |
| 2,924,694 A | * | 2/1960 | Kreider ........................ | 156/378 |
| 3,115,564 A | * | 12/1963 | Stacy ........................... | 156/513 |
| 3,461,998 A | * | 8/1969 | Ploeger, Jr. ................... | 400/241.1 |
| 3,732,768 A | * | 5/1973 | Hodson et al. ................ | 83/171 |
| 3,772,112 A | * | 11/1973 | Lyons et al. ................... | 156/88 |
| 3,796,625 A | * | 3/1974 | Rutledge ...................... | 156/159 |
| 4,001,067 A | * | 1/1977 | Johnson ....................... | 156/159 |
| 4,207,021 A | * | 6/1980 | Burdett, Jr. .................. | 414/412 |
| 4,984,490 A | * | 1/1991 | Kurki ............................ | 83/13 |
| 5,095,920 A | * | 3/1992 | Mattei ......................... | 131/117 |
| 5,240,534 A | * | 8/1993 | Tokita et al. ................. | 156/134 |
| 5,709,761 A | * | 1/1998 | Tajima et al. ................. | 156/159 |
| 5,906,698 A | * | 5/1999 | House et al. ................. | 156/137 |
| 6,230,597 B1 | * | 5/2001 | Baba et al. .................... | 83/171 |

* cited by examiner

Primary Examiner—Mark A. Osele
(74) Attorney, Agent, or Firm—David E. Wheeler; David L. King

(57) ABSTRACT

A rotatable cutting wheel is used to heat a polymer substrate as it is being cut. The cutting wheel has a heater and a thermocouple associated therewith, which are used to heat and control the temperature of the cutting wheel. The heat softens the substrate, making it easier to cut and reducing distortion caused by cutting. A cleaner cut also makes it more likely that polymer will be retained on reinforcement when the substrate is a reinforced polymer. A method of the invention comprises the steps of heating the cutting wheel and traversing the substrate with the heated cutting wheel.

6 Claims, 5 Drawing Sheets

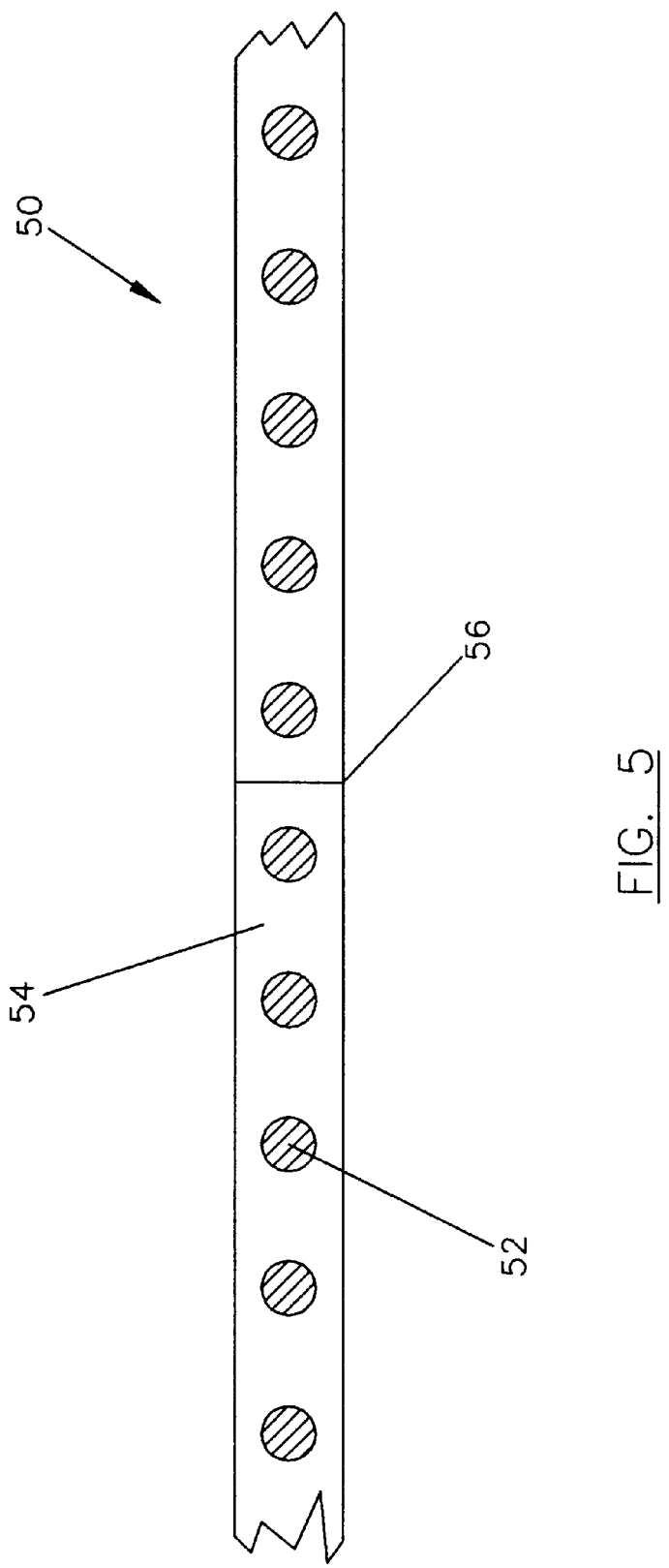

HEATED CUTTING WHEEL

FIELD OF THE INVENTION

The invention relates to a method and apparatus for cutting material substrates. The apparatus described is particularly adapted for cutting flat substrates such as calendered elastomers and composite plies.

BACKGROUND OF THE INVENTION

In the manufacture of tires, because of the nature of the tire building process, it is common that tire components are spliced as they are laid up on the tire building drum. The most common splice in a tire is an overlap splice, but in some constructions, butt splicing of the tire components is preferred.

One of the reasons that overlap splices are most common is that less precision is needed for an overlap splice than for a butt splice. In a butt splice, the tire component needs to be very close to the precise length needed for the component to circumvent the building drum and the tire components that have previously been applied to the building drum. If the component is too long, the butt splice creates a bulge, and if a component is too short, there will be a gap between the ends of the component on the building drum. Also, the better the precision in the butt splice, the more likely it is that the butt splice will retain its integrity as the green tire is subjected to expansion during the curing step in the tire manufacturing process.

In the early days of tire building, ply stock was often cut manually using a builder's hot knife or an automatic plunge cut hook knife. Both these tools have the potential for cutting gum stock away from the wire when the material being cut is a reinforced composite, such as those used in making the carcass ply of the tire. For adhesion of the butted ends in a butt splice, it is preferred that some gum stock remains on the wire, preferably on both sides of the cut. To address some of the difficulties noted using manual procedures and hook knives, recent attempts to automate the cutting procedure include an automatic ply cut using a cold turning circular blade (a pizza cutter). The circular blade provides an excellent cut but has a tendency to pinch the material being cut against the cutting anvil. A pinched or rounded cut edge reduces the optimum surface area in those applications where a butt splice is used. For a butt splice, it is preferred that the two ends of the composite component be square, so that they have optimum surface area when the two square ends are stitched together in the product. Also, it is preferred that the two square ends have as much tack as possible.

SUMMARY OF THE INVENTION

An apparatus for cutting a substrate comprises a rotatable cutting wheel having heating means, temperature measuring means, and optionally temperature control means associated therewith.

In an illustrated embodiment, an apparatus for cutting a substrate comprises (a) a rotatable cutting wheel mounted on sliding means associated with a slide, (b) a hard cutting surface associated with the slide, the cutting wheel being disposed between the cutting surface and the slide, and (c) heating means, temperature measuring means and optionally a temperature control means associated with the cutting wheel. The rotatable cutting wheel is mounted on a hollow spindle and a heating means is housed within the hollow spindle, and a thermocouple associated with the rotatable cutting wheel is connected to the heating means. An electrical slip ring provides an electrical connection between a power supply and the thermocouple and heating means. The temperature control means may be a temperature control unit capable of monitoring the temperature of the cutting wheel and signaling an operator when the temperature is outside a designated range. The temperature control unit has means for increasing energy input to the heating means when the temperature drops below a specified range and decreasing the energy input to the heating means when the temperature rises above a specified range.

Since the assembly for heating the cutting wheel is heated, the hollow spindle is supported on high temperature bearings.

A hard cutting surface provided opposite the cutting wheel may be provided as an anvil integrally connected to the apparatus.

Also provided is a method for cutting a substrate comprising the steps of (a) placing a substrate on a hard surface wherein the substrate is disposed between the hard surface and a cutting wheel (b) heating the cutting wheel above room temperature to a temperature at or below the melting temperature of the substrate, thereby obtaining a heated cutting wheel, and (c) traversing the substrate with the heated cutting wheel. In the illustrated embodiment, the method further comprises the steps of mounting the cutting wheel on a slide and sliding the cutting wheel across the substrate. The method may further comprise the step of maintaining the cutting wheel at a pre-specified temperature.

Also provided is a method of making a butt splice comprising the steps of (a) heating a rotatable cutting wheel above room temperature to a temperature at or less than the melting temperature of a polymer substrate intended for use in making a butt splice (b) cutting the substrate with a heated cutting wheel and (c) laying the substrate up in a polymeric product where two cut ends of the substrate are butted against one another.

It is an object of the invention to provide apparatus and an improved cutting method for preparing substrates in a manufacturing process.

It is a further object of the invention to improve the cutting process for elastomeric and plastic materials that are used in manufacturing processes.

Other objects of the invention will be apparent from the following description and claims.

BRIEF DESCRIPTION OF THE DRAWINGS

The invention will be described by way of example and with reference to the accompanying drawings in which:

FIG. 5 illustrates a cross-section of the ends of a butt splice of a composite ply prepared according to the invention.

DETAILED DESCRIPTION OF THE PREFERRED EMBODIMENTS

For ease of description, the invention will be described as it relates to cutting elastomeric composite plies that may be used in the construction of tires. Those skilled in the art will recognize that the cutting apparatus of the invention may be used to cut any substrate that is softened when it is heated, and can be used to cut unreinforced as well as reinforced substrates. A heated cutting apparatus of the invention can be used manually. In an illustrated embodiment, the apparatus is used in conjunction with other equipment, and is automated.

Figure 1:
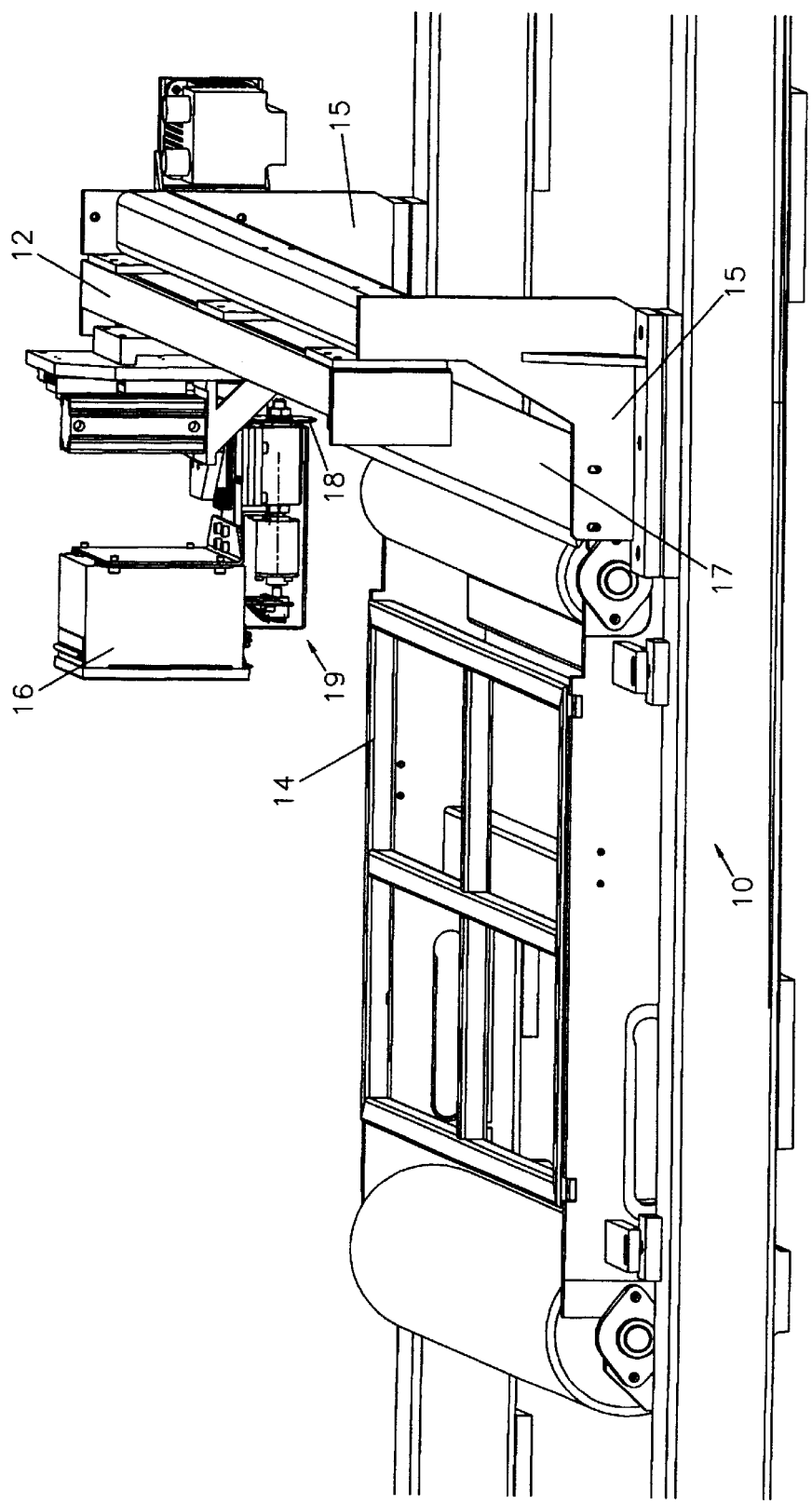
FIG. 1 illustrates the cutting apparatus of the invention attached to a calender.
Figure 2:
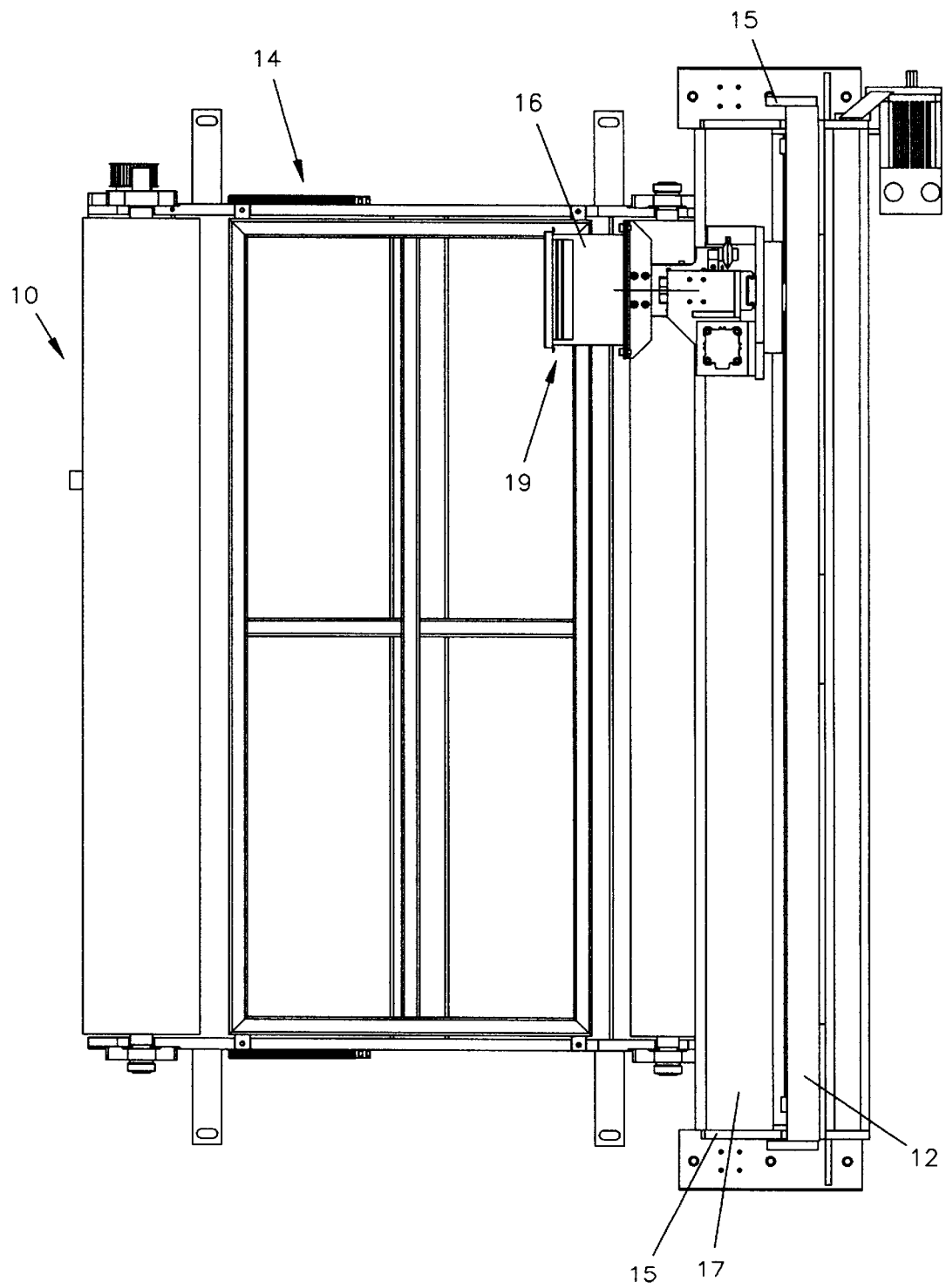
FIG. 2 illustrates an overhead view of the cutting apparatus.

With reference now to FIGS. 1 and 2, the apparatus 10 of the invention, in the illustrated embodiment, comprises a calendar 14 having a bracket or slide 12 connected to sides 15 thereof such that bracket or slide 12 is disposed vertically above calender 14. Material or substrate which passes over calender 14 is disposed between bracket or slide 12 and calender 14.

In the illustrated embodiment, an anvil 17 is included in an integral unit with slide 12 and sides 15. A substrate rests against the hard surface of anvil 17 as it is being cut.

As used herein, the word "calender" is used broadly to represent any type of apparatus that uses rollers to convey, for example, a flattened gum or composite material. In the illustrated embodiment, stock material is fed on rollers (a conveyor) at the tire building machine so that the tire builder can cut carcass ply material to a predetermined length as a tire is being built. Those skilled in the art will recognize that the invention can be used to precut calendered material to preset lengths if desired.

In the illustrated embodiment, the cutting apparatus 19 is fixedly or slidably mounted on a slide 12 and a power box 16 provides power to cutting apparatus 19.

Figure 3:
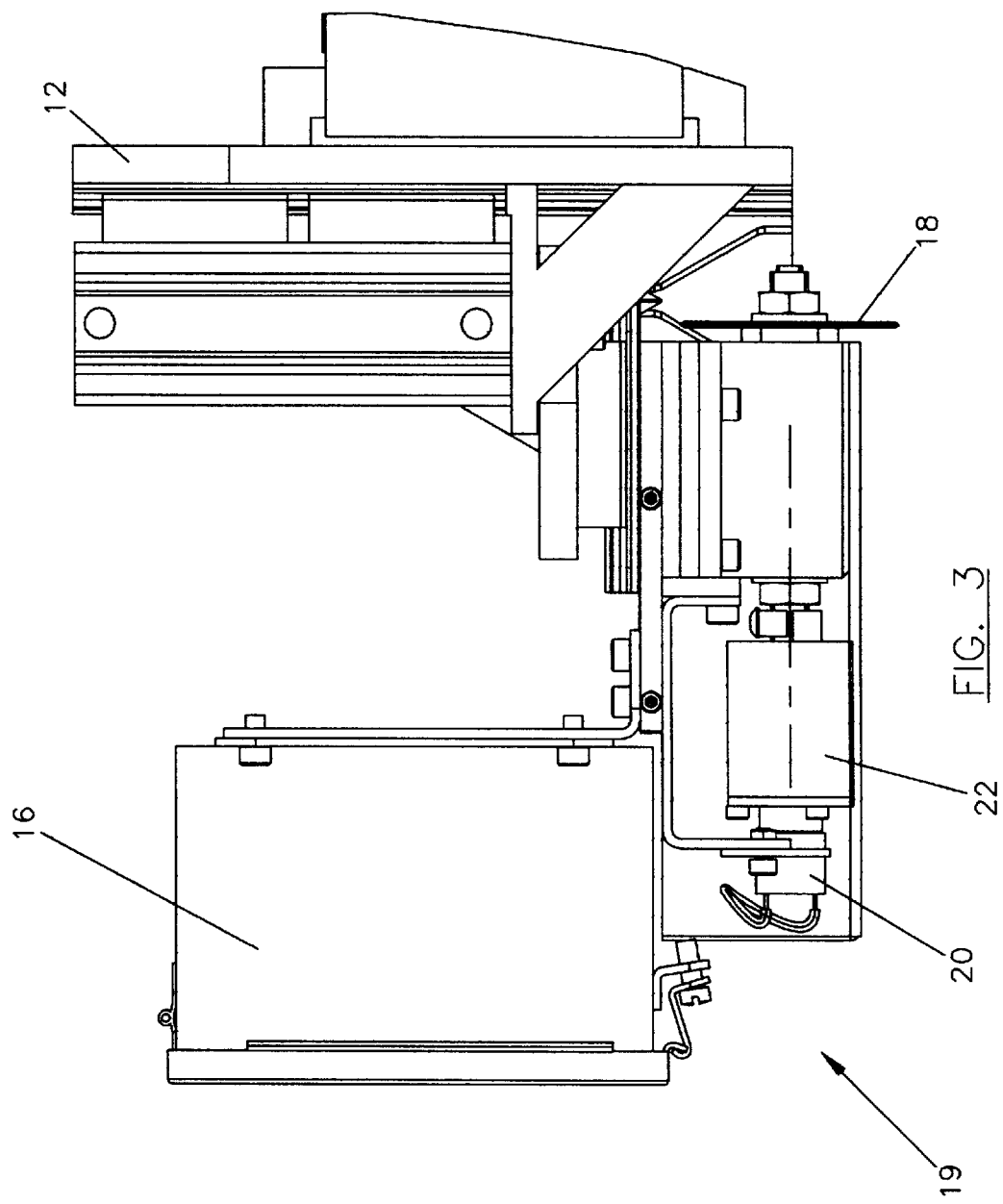
FIG. 3 illustrates an enlarged side view of the cutting apparatus.
Figure 4:
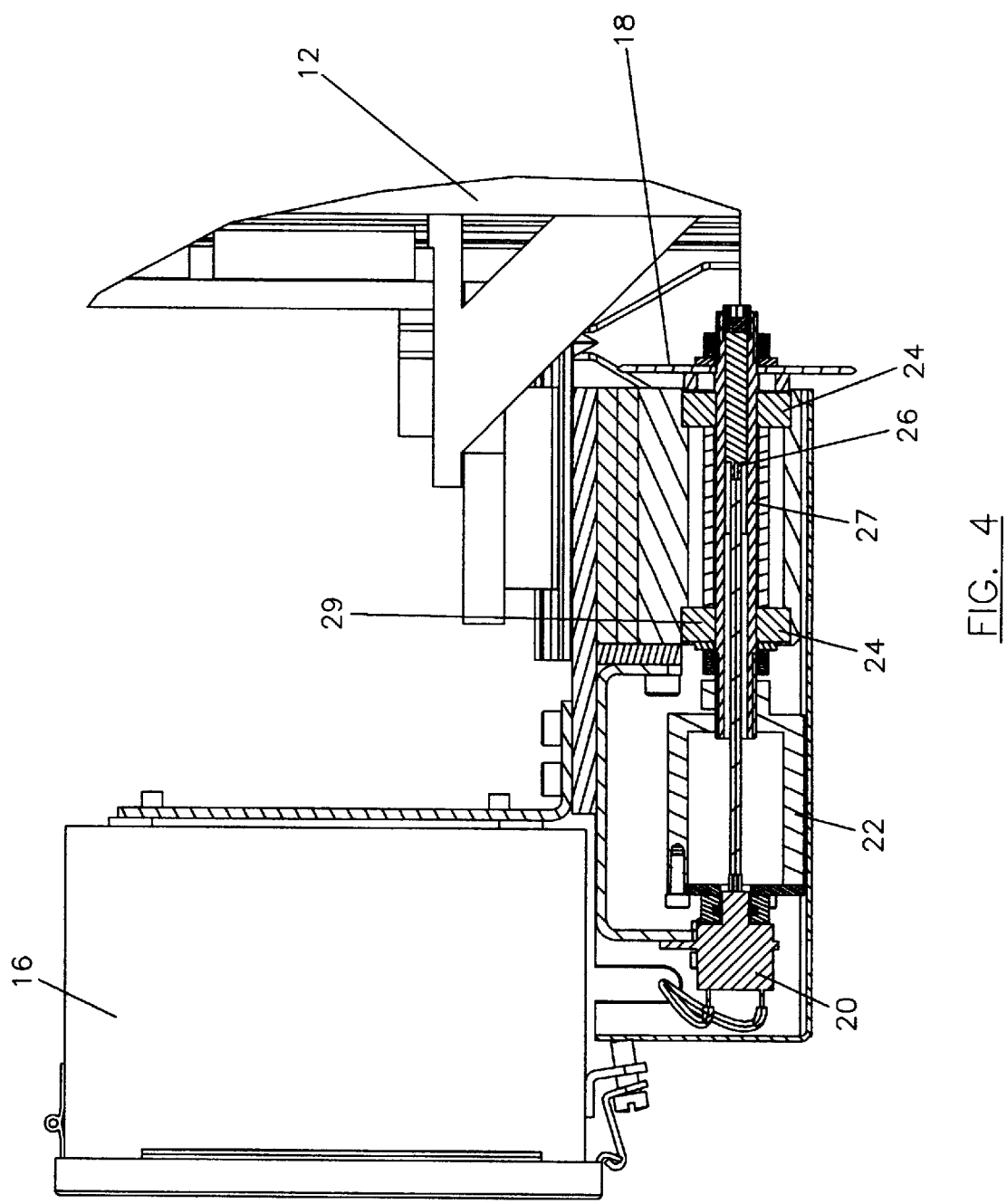
FIG. 4 illustrates a cutaway view of the cutting apparatus from the perspective illustrated in FIG. 3.

With reference now to FIGS. 3 and 4, a side view and a cutaway side view of cutting apparatus 19, respectively, are illustrated.

In an embodiment where cutting apparatus 19 is slidably attached to slide 12, cutting apparatus 19 is moved from one end of slide 12 to the other, cutting substrate as it traverses the slide. In another possible use of the apparatus, cutting apparatus 19 may be oriented along the length of the substrate and fixedly attached to slide 12. In such an embodiment the substrate will be cut as it passes by cutting wheel 18, as the substrate passes through the apparatus.

With reference now to FIGS. 3 and 4, cutting wheel 18 is mounted on hollow spindle 27 and heater/thermocouple 26 is housed in hollow spindle 27. Hollow spindle 27 is connected to junction box 22 which contains wiring for heater/thermocouple 26. Junction box 22 is connected to slip ring 20, which provides an electrical connection between heater/thermocouple 26 and power box 16. The assembly of slip ring 20, junction box 22, hollow spindle 27, and cutting wheel 18 rotate together on kiln bearings 24. An integral graphite bearing cage 29 is provided in the assembly to provide graphite lubrication to kiln bearings 24.

Those skilled in the art will recognize that the slip ring may be located elsewhere in the assembly so that, for example, only cutting wheel 18 rotates, or the cutting wheel 18 and hollow spindle 27 rotates. Other possible arrangements of the assembly will be apparent to those skilled in the art.

Graphite cage 29 is used in the illustrated embodiment to lubricate bearings 24, in place of oil or grease, because of the potential for high temperatures that may be reached in hollow spindle 27 when cutting wheel 18 is heated, and to prevent the spatter of oil or grease having elevated temperatures onto the substrate.

In the use of the apparatus, particularly with reference to FIGS. 1 and 2, power is provided from electrical box 16 to heater/thermocouple 26 which is sufficient to bring the temperature of cutting wheel 18 above room temperature and potentially up to the melting point of the substrate which will be cut. The desired length of substrate is fed into the apparatus 10 and is disposed stationary between cutting apparatus 19 and anvil 17 and, in the illustrated embodiment, cutting apparatus 19 is moved across slide 12 to cut the substrate. To cut additional lengths of substrate, additional substrate is fed into apparatus 10, and the cutting step is repeated.

Those skilled in the art will recognize that the procedure may be automated and that the method can be used to cut any suitable substrate material which softens at elevated temperatures, when it is desired that the cut be made with as little distortion of the substrate as possible.

The apparatus of the invention has been found particularly useful as it relates to a tire manufacturing process in that heated cutting wheel 18 makes it possible to cut a wire reinforced elastomer such that the cut edges are substantially square.

In order to improve the likelihood that elastomer will be retained on reinforcement in a composite substrate, the temperature control means may be a temperature control unit capable of monitoring the temperature of the cutting wheel and signaling an operator when the temperature is outside a designated range. The temperature control unit may have means for increasing energy input to the heating means when the temperature drops below a specified range, and decreasing the energy input to the heating means when the temperature rises above a specified range.

As used herein, the term "wire" is used to describe filamentary reinforcement material, regardless of the material used to make the reinforcement. Thus textile filamentary reinforcement is intended to be included in the use of the term.

Softening of the heated elastomer makes it possible for elastomer to be retained on wire reinforcement after the cut, when a composite ply is used, as illustrated in FIG. 5. In FIG. 5, the substrate 50 comprises a single strip of material which is looped into a circle and the ends meet at splice 56. In substrate 50, filament reinforcement 52 is encased in elastomeric material 54. For the purposes of butt splicing, the square edges of the cut provide a maximum surface area when the two ends of the ply meet on the building drum, and since elastomer is retained on the wires separated by the cut, there is an additional adhesive connection between the two ends of the ply when a butt splice is made.

Accordingly, the invention may also comprise a method of making a butt splice comprising the steps of heating a rotatable cutting wheel above room temperature to a temperature at or less than the melting temperature of a polymer substrate intended for use in making a butt splice, cutting the substrate with a heated cutting wheel and laying the substrate up in a polymeric product where two cut ends of the substrate are butted against one another.

What is claimed is:

1. An apparatus for cutting a substrate comprising:
   (a) a rotatable cutting wheel having heating means, temperature measuring means and temperature control means associated with said cutting wheel, the rotatable cutting wheel being mounted on sliding means associated with a slide;
   (b) a hard cutting surface associated with said slide, said cutting wheel being disposed between said cutting surface and said slide; and wherein the rotatable cutting wheel is mounted on a hollow spindle and a heating means is housed within said hollow spindle, and a thermocouple associated with the rotatable cutting wheel is connected to said heating means, and an electrical slip ring provides an electrical connection between said thermocouple and said heating means.

2. The apparatus of claim 1 wherein the temperature control means is a temperature control unit capable of monitoring the temperature of the cutting wheel and signaling an operator when the temperature is outside a designated range.

3. The apparatus of claim 2 wherein the temperature control unit has means for increasing energy input to the heating means when the temperature drops below a specified range and decreasing the energy input to the heating means when the temperature rises above a specified range.

4. The apparatus of claim 1 wherein said hollow spindle is supported on high temperature bearings.

5. The apparatus of claim 1 wherein said hard cutting surface is an anvil.

6. A method for cutting a substrate comprising the steps of:
   (a) placing a desired length of a substrate on a hard surface wherein the substrate is disposed between said hard surface and a rotatable cutting wheel mounted on a slide;
   (b) heating said cutting wheel above room temperature to a temperature at or below the melting temperature of said substrate thereby obtaining a heated cutting wheel; and sliding and rotating said heated cutting wheel across said slide to cut the substrate while maintaining said cutting wheel at a pre-specified temperature; and
   (c) making a butt splice laying the substrate up in a polymeric product where two cut ends of the substrate are butted against one another.

* * * * *